(12) United States Patent
Takii

(10) Patent No.: US 10,507,773 B2
(45) Date of Patent: Dec. 17, 2019

(54) TRACTOR

(71) Applicant: Yanmar Co., Ltd., Osaka-shi, Osaka-fu (JP)

(72) Inventor: Daisuke Takii, Osaka (JP)

(73) Assignee: YANMAR CO., LTD., Osaka (JP)

(*) Notice: Subject to any disclaimer, the term of this patent is extended or adjusted under 35 U.S.C. 154(b) by 0 days.

(21) Appl. No.: 15/749,066

(22) PCT Filed: Jul. 28, 2016

(86) PCT No.: PCT/JP2016/003490
§ 371 (c)(1),
(2) Date: Jan. 30, 2018

(87) PCT Pub. No.: WO2017/022216
PCT Pub. Date: Feb. 9, 2017

(65) Prior Publication Data
US 2018/0215330 A1    Aug. 2, 2018

(30) Foreign Application Priority Data

Jul. 31, 2015 (JP) .................................. 2015-151934
Jul. 31, 2015 (JP) .................................. 2015-152035

(51) Int. Cl.
*B60R 16/023* (2006.01)
*F02B 65/00* (2006.01)
*F02B 77/00* (2006.01)
*B60R 16/02* (2006.01)

(52) U.S. Cl.
CPC ...... *B60R 16/0231* (2013.01); *B60R 16/0215* (2013.01); *B60R 16/0239* (2013.01);
(Continued)

(58) Field of Classification Search
CPC . B60R 16/0231; B60R 16/0215; B60R 16/02; F02B 77/00; F02B 65/00
See application file for complete search history.

(56) References Cited

U.S. PATENT DOCUMENTS 4,776,183 A * 10/1988 Okoma ................. F25B 43/006
55/308
2009/0242295 A1  10/2009 Hosoda
(Continued)

FOREIGN PATENT DOCUMENTS

EP         2679448 A2    1/2014
JP      02-207169 A     8/1990
(Continued)

OTHER PUBLICATIONS

Extended European search report dated Feb. 19, 2019 issued in corresponding EP Application 16832499.4 cites the patent documents above.

(Continued)

*Primary Examiner* — Jacob M Amick
*Assistant Examiner* — Charles Brauch
(74) *Attorney, Agent, or Firm* — Norton Rose Fulbright US LLP

(57) ABSTRACT

A tractor including: a condenser frame disposed ahead of an engine body; a support plate fixed to the condenser frame; and an engine controller supported by the support plate with vibration-isolating rubber members interposed therebetween. The engine controller is disposed ahead of and above the engine body in a hood. The engine controller declines forward. At least one of the plurality of vibration-isolating rubber members is oriented in a direction perpendicular to a thickness direction of the engine controller, and at least one of the plurality of vibration-isolating rubber members is oriented in a direction parallel to the thickness direction.

9 Claims, 14 Drawing Sheets

(52) U.S. Cl.
CPC .............. *F02B 65/00* (2013.01); *F02B 77/00* (2013.01); *B60R 16/02* (2013.01)

(56) References Cited

U.S. PATENT DOCUMENTS

| | | | | |
|---|---|---|---|---|
| 2013/0077264 A1* | 3/2013 | Schwulst | ............. | H05K 5/0034 361/748 |
| 2013/0327582 A1* | 12/2013 | Kim | ........................ | B60R 16/02 180/68.3 |
| 2015/0083515 A1 | 3/2015 | Tani et al. | | |

FOREIGN PATENT DOCUMENTS

| | | | |
|---|---|---|---|
| JP | 10257646 A | * | 9/1998 |
| JP | 2006-348907 A | | 12/2006 |
| JP | 2009-209699 A | | 9/2009 |
| JP | 2009209699 A | * | 9/2009 |
| JP | 2012-201159 A | | 10/2012 |
| JP | 2014-211166 A | | 11/2014 |
| JP | 2015-44437 A | | 3/2015 |
| KR | 10-2011-0104300 A | | 9/2011 |
| WO | 2014/081201 A1 | | 5/2014 |

OTHER PUBLICATIONS

International Search Report dated Oct. 25, 2016 issued in corresponding PCT Application PCT/US2016/003490 cites the patents documents above.
Japanese Office Action dated Jan. 10, 2019 issued in corresponding JP Application 2015-151934 cites the patents documents above.

* cited by examiner

TRACTOR

CROSS REFERENCES TO RELATED APPLICATIONS

This application is a national stage application pursuant to 35 U.S.C. § 371 of International Application No. PCT/JP2016/003490, filed on Jul. 28, 2016, which claims priority under 35 U.S.C. § 119 to Japanese Patent Application Nos. 2015-151934 and 2015-152035, both filed on Jul. 31, 2015, the disclosures of which are hereby incorporated by reference in their entireties.

TECHNICAL FIELD

The present invention relates to a tractor.

BACKGROUND ART

In a tractor known to date, an engine controller (engine control unit: ECU) for controlling an engine body is mounted near the engine body. Patent Literature 1 (PLT 1) discloses a tractor of this type. The tractor of PLT 1 is configured such that the ECU is disposed behind the engine.

CITATION LIST

Patent Literature

PTL 1: Japanese Patent Application Laid-Open No. 2014-211166

SUMMARY OF INVENTION

Technical Problem

In the configuration described in PTL 1, however, the engine controller is disposed behind the engine, and thus, there is a room for improvement in terms of difficulty of access in maintenance.

Some aspects of the present invention have been made in view of the foregoing circumstances and have an object of providing a tractor that can ease maintenance of an engine controller, prevent transfer of vibrations and impacts to an engine controller, and suppress occurrence of abnormality in an engine.

Solution to Problem and Advantages

Problems to be solved by some aspects of the present invention have been described above, and solutions for the problems and advantages of the solutions will be described below.

In an aspect of the present invention, a tractor having the following configuration is provided. Specifically, the tractor includes an engine body, a first support member, a second support member, and an engine controller. The first support member is disposed ahead of the engine body. The second support member is fixed to the first support member. The engine controller is supported by the second support member with the vibration-isolating rubber member interposed therebetween. The second support member is disposed above the first support member. The engine controller is disposed above the second support member.

Accordingly, vibrations and impacts on the engine controller can be reduced so that abnormality does not easily occur in operation of the engine controller. In addition, an operator can easily access the engine controller, and thus, maintenance the engine controller can be easily performed.

In the tractor, the engine controller is preferably disposed to decline forward.

Accordingly, in the case where the shape of a front portion of the hood declines forward, arrangement of the engine controller can be made compact along the inner wall of the hood. As a result, inner space of the hood can be efficiently used.

The tractor described above preferably has the following configuration. Specifically, the engine controller has a substantially flat plate shape. The vibration-isolating rubber member includes a plurality of vibration-isolating rubber members. At least one of the plurality of vibration-isolating rubber members is oriented in a direction perpendicular to a thickness direction of the engine controller. At least one of the plurality of vibration-isolating rubber members is oriented in a direction parallel to the thickness direction of the engine controller Accordingly, vibrations and impacts in various directions can be stably reduced by using a combination of vibration-isolating rubber members oriented in different directions. As a result, abnormality of operation of the engine controller can be prevented.

The tractor described above preferably has the following configuration. Specifically, the tractor includes a radiator disposed ahead of the engine body. The engine controller is disposed farther from the engine body than the radiator is.

Accordingly, a layout in which heat is not easily transferred from the engine body to the engine controller can be achieved so that abnormality does not easily occur in operation of the engine controller.

In the tractor described above, a partition plate is preferably disposed between the engine controller and the engine body.

Accordingly, heat transfer from the engine body to the engine controller can be effectively prevented by the partition plate so that stable operation of the engine controller can be achieved.

The tractor described above preferably has the following configuration. Specifically, the tractor includes an intake pipe and an engine harness. The intake pipe supplies intake air to an intake unit of the engine body. The engine harness electrically connects the engine body and the engine controller to each other. A rib is formed along a front-rear direction (longitudinal direction) of the intake pipe. The rib supports at least one of the engine harnesses.

Accordingly, the engine harnesses can be routed between the engine body and the engine controller by using the rib of the intake pipe. Accordingly, the number of components can be reduced as compared to a configuration in which an additional stay for supporting the engine harness is provided. Thus, the weight of the tractor and manufacturing costs can be reduced. In addition, since the engine harnesses are supported by the rib of the intake pipe, the engine harnesses can be arranged along the intake pipe so that the engine harnesses can be placed in a small space.

In the tractor described above, the engine harness is preferably attached to the rib of the intake pipe in a region opposite to the engine body relative to the partition plate.

Accordingly, in the region opposite to the engine body relative to the fan shroud, heat exchangers such as the radiator and members such as the condenser and the battery are disposed, and a relatively large space is present above the heat exchangers and the members such as the condenser and the battery in a conventional configuration. This space is utilized for simply routing the engine harness.

The tractor described above preferably has the following configuration. Specifically, the intake pipe is disposed to pass through a notch or a through hole in the partition plate. The engine harness passes through the notch or the through hole in the partition plate while being attached to the rib.

In this configuration, the engine harness is routed to penetrate the fan shroud so that the length of the engine harness can be reduced. Accordingly, manufacturing costs can be reduced, and maintenance can be easily performed.

In the tractor described above, the engine harnesses are preferably disposed farther from the engine body than the rib is.

Accordingly, the engine harnesses are routed to be farther from the engine body than the rib is, and thus, maintenance of the engine harnesses can be easily performed. That is, the rib is less likely to hinder removal of the engine harnesses from the engine during maintenance.

The tractor described above preferably has the following configuration. Specifically, the tractor includes a bind member for binding the engine harnesses. The bind member is fixed to the rib.

In this configuration, the bundled engine harnesses are fixed to the rib through the bind member so that the engine harnesses can be routed in a stable state with a small number of components.

The tractor described above preferably has the following configuration. Specifically, the tractor further includes a fixing member attached to the bind member. The rib has an attachment hole for removably attaching the fixing member.

Accordingly, the fixing member can be easily fixed to the rib. In addition, the engine harnesses can be easily removed from the rib by removing the fixing member from the attachment hole. Accordingly, maintenance can be easily performed.

DESCRIPTION OF EMBODIMENTS

Figure 1:
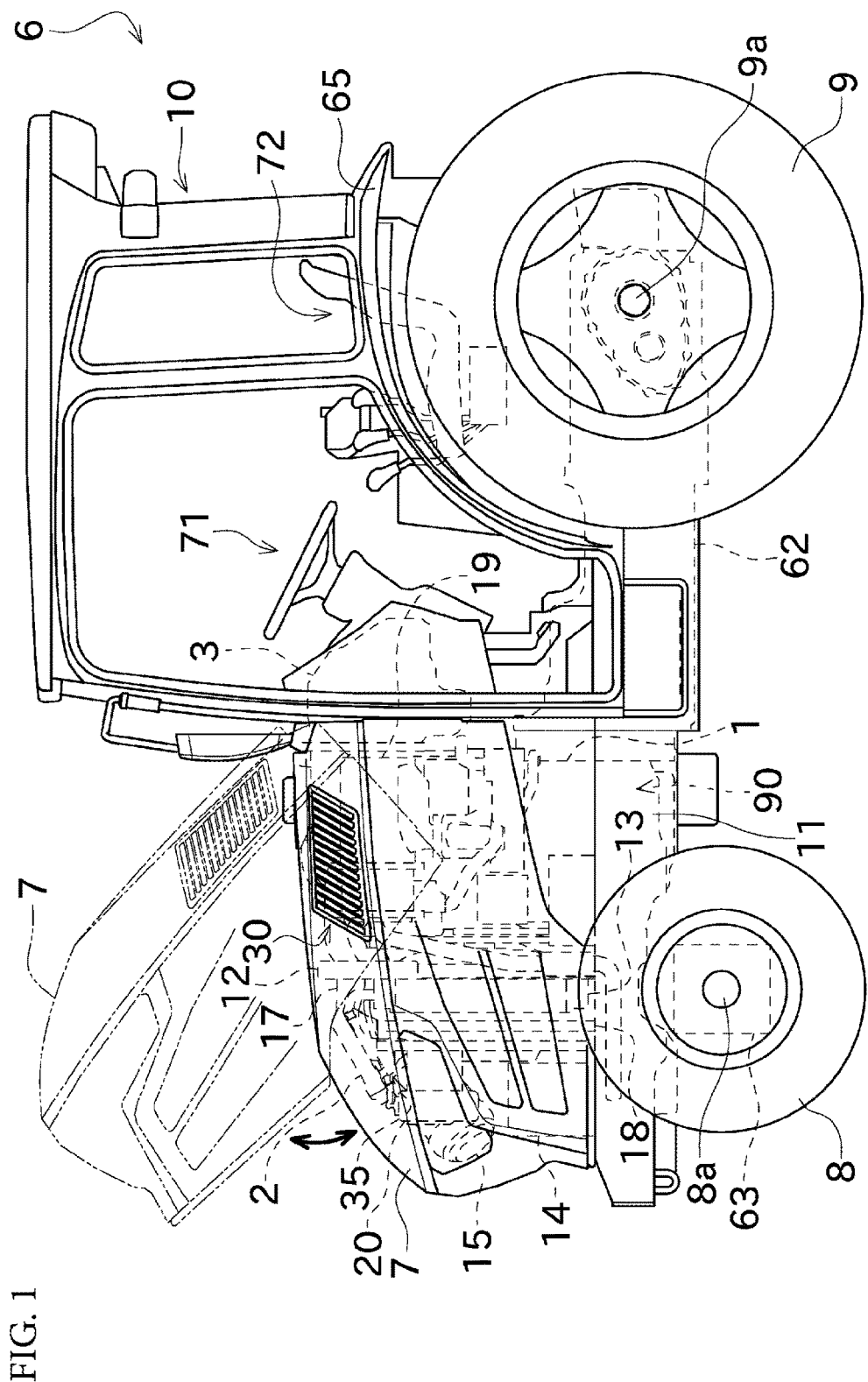
FIG. 1 A right side view illustrating an overall configuration of a tractor according to an embodiment of the present disclosure.

With reference to drawings, an embodiment of the present disclosure will now be described. FIG. 1 is a right side view illustrating an overall configuration of a tractor 6 according to an embodiment of the present invention. In the following description, terms such as "left" and "right" refer to the left and the right, for example, in the direction in which the tractor 6 moves forward.

The tractor 6 serving as a work vehicle (work machine) for farm work illustrated in FIG. 1 is equipped with various devices such as a plow, a harrow, and a loader to enable various types of work. Front wheels 8 are disposed in a front portion of the tractor 6, and rear wheels 9 are disposed in a rear portion of the tractor 6.

A hood 7 is disposed on the front portion of the tractor 6 and is configured to be opened and closed so as to expose the inside. The hood 7 has a streamline shape, and a front portion of the hood 7 gradually becomes narrow in both of the top-bottom direction (vertical direction) and the left-right direction (lateral direction) toward the front. This shape can achieve reduction of air resistance during travelling and enhancement of aesthetic design.

The hood 7 houses an engine body 1. The engine body 1 is supported by an engine frame 11 of the tractor 6 directly or with a vibration isolator interposed therebetween.

The engine body 1 is configured as a common rail diesel engine including a plurality of cylinders. Specifically, the engine body 1 includes an unillustrated common rail that stores fuel under high pressure. Fuel supplied from the common rail is ejected into a combustion chamber by an unillustrated injector disposed for each of the cylinders.

A cabin 10 an operator is to get aboard is disposed behind the hood 7, and includes therein an operation unit 71 for performing various operations and a seat unit 72. The operator of the tractor 6 can operate a traveling operation or other operations of the tractor 6 with the operation unit 71.

A vehicle body frame of the tractor 6 includes the engine frame 11 and a transmission case 62 fixed to a rear portion of the engine frame 11. A front axle case 63 is attached to the bottom of the engine frame 11. The front wheels 8 are attached to the front axle case 63 with a front axle 8a interposed therebetween. The rear wheels 9 are attached to the transmission case 62 with a rear axle 9a interposed therebetween. Spaces above the left and right rear wheels 9 are covered with left and right rear fenders 65.

The transmission case 62 decelerates a driving force from the engine body 1 and transmits the force to the front axle case 63 and the rear axle 9a. When the operator operates a shift lever of an unillustrated transmission device, the gearshift ratio in the transmission case 62 is thereby changed so that the traveling speed of the tractor 6 can be adjusted.

The driving force of the engine body 1 is transmitted to a PTO shaft (not shown) projecting from the rear end of the transmission case 62. The tractor 6 is configured to be equipped with the devices described above at the rear end of the tractor 6. The PTO shaft can drive work devices with an unillustrated universal joint, for example.

The thus-configured tractor 6 can perform various types of work such as tillage, seeding, and harvesting, while traveling on a field.

Figure 2:
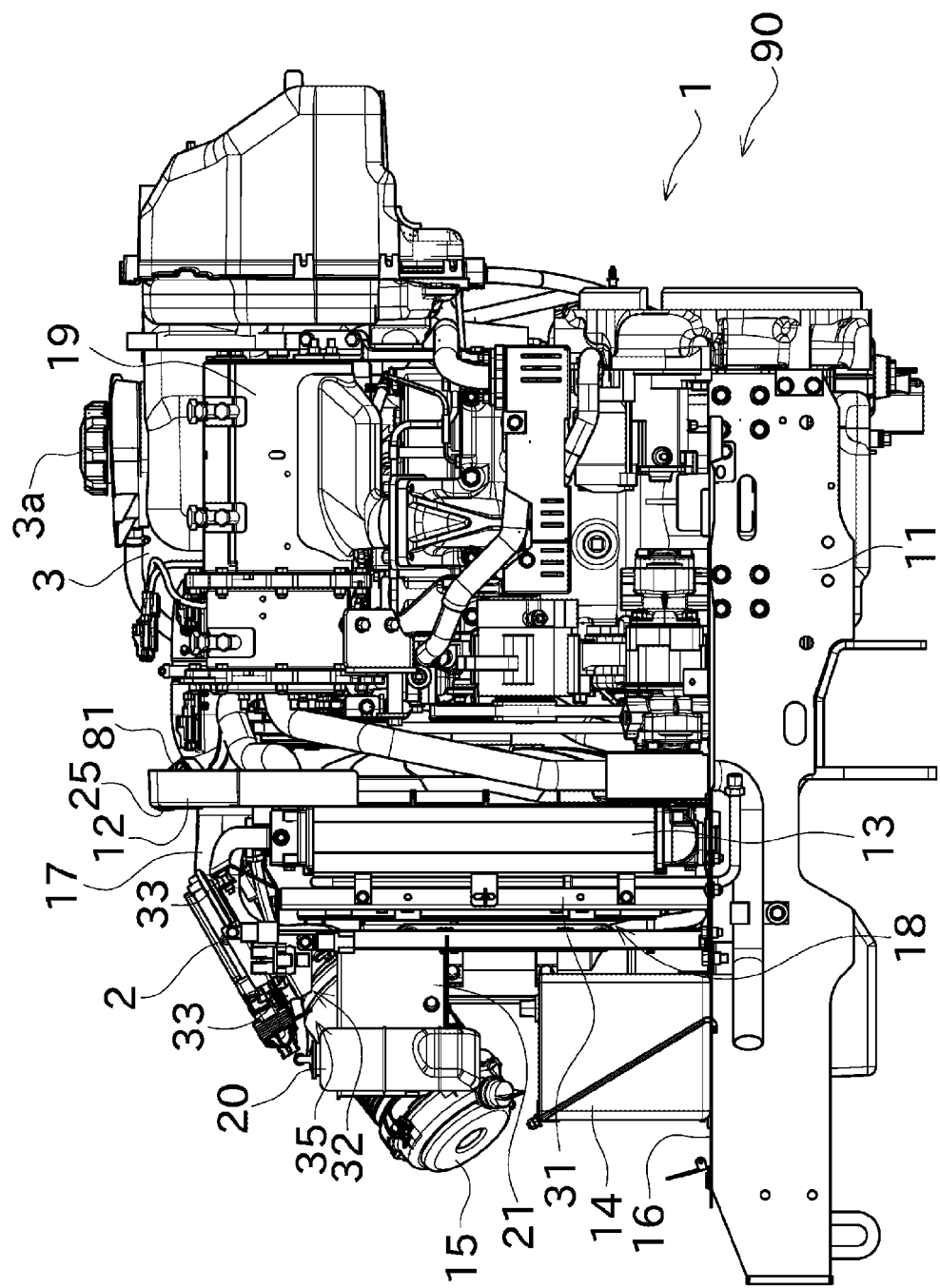
FIG. 2 A right side view illustrating a state inside a hood of the tractor.
Figure 3:
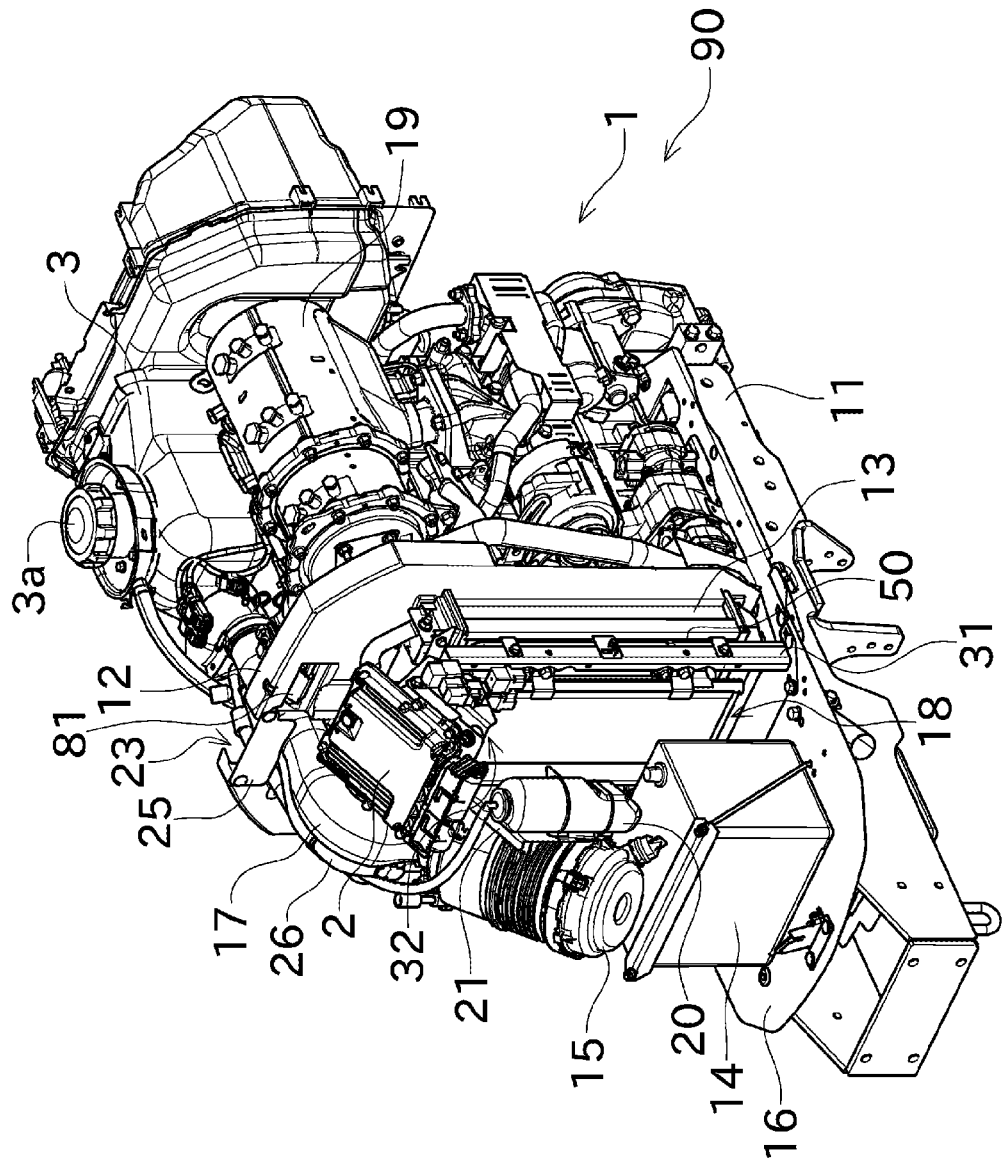
FIG. 3 A perspective view illustrating the sate inside the hood.
Figure 4:
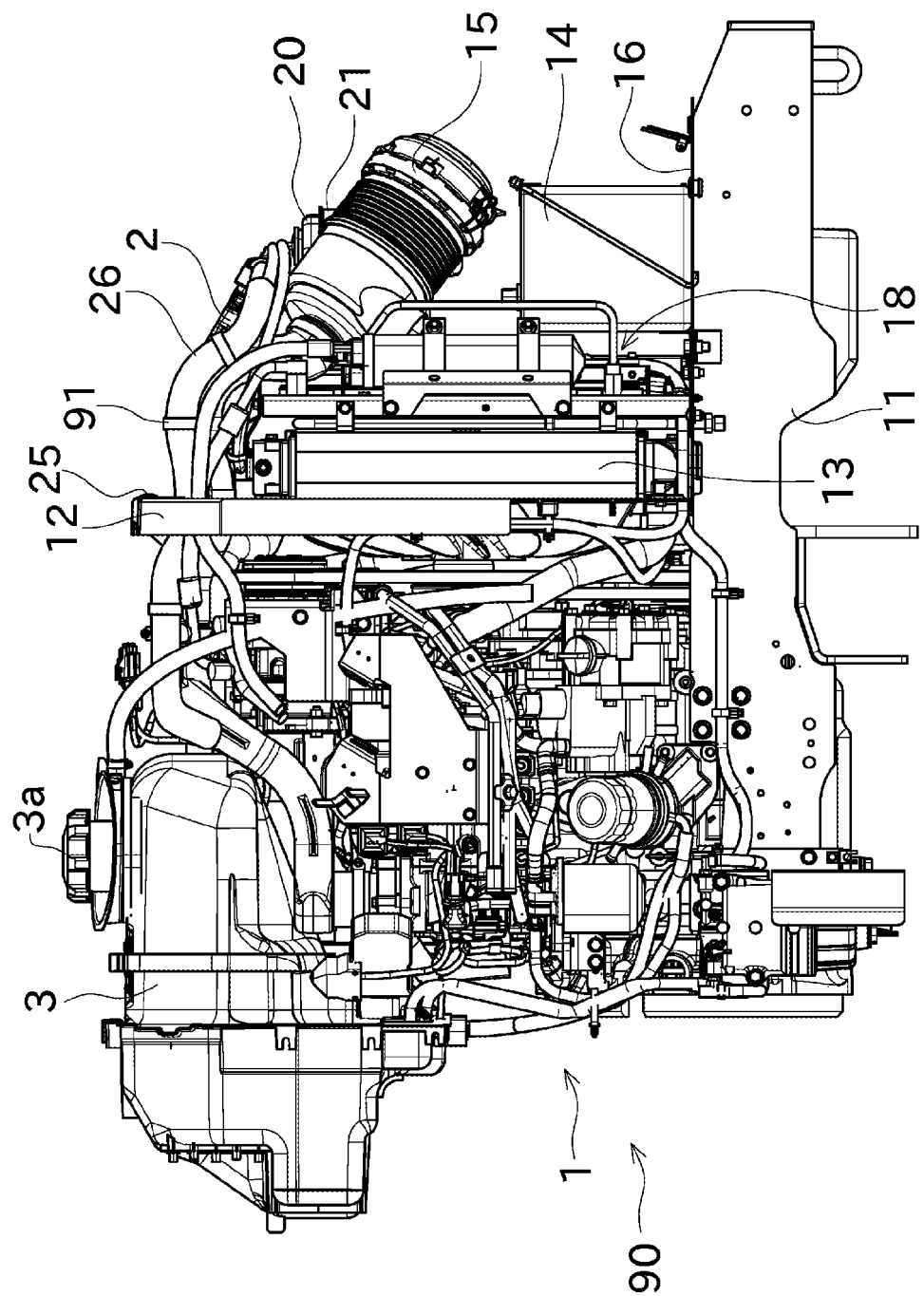
FIG. 4 A left side view illustrating the state inside the hood.
Figure 5:
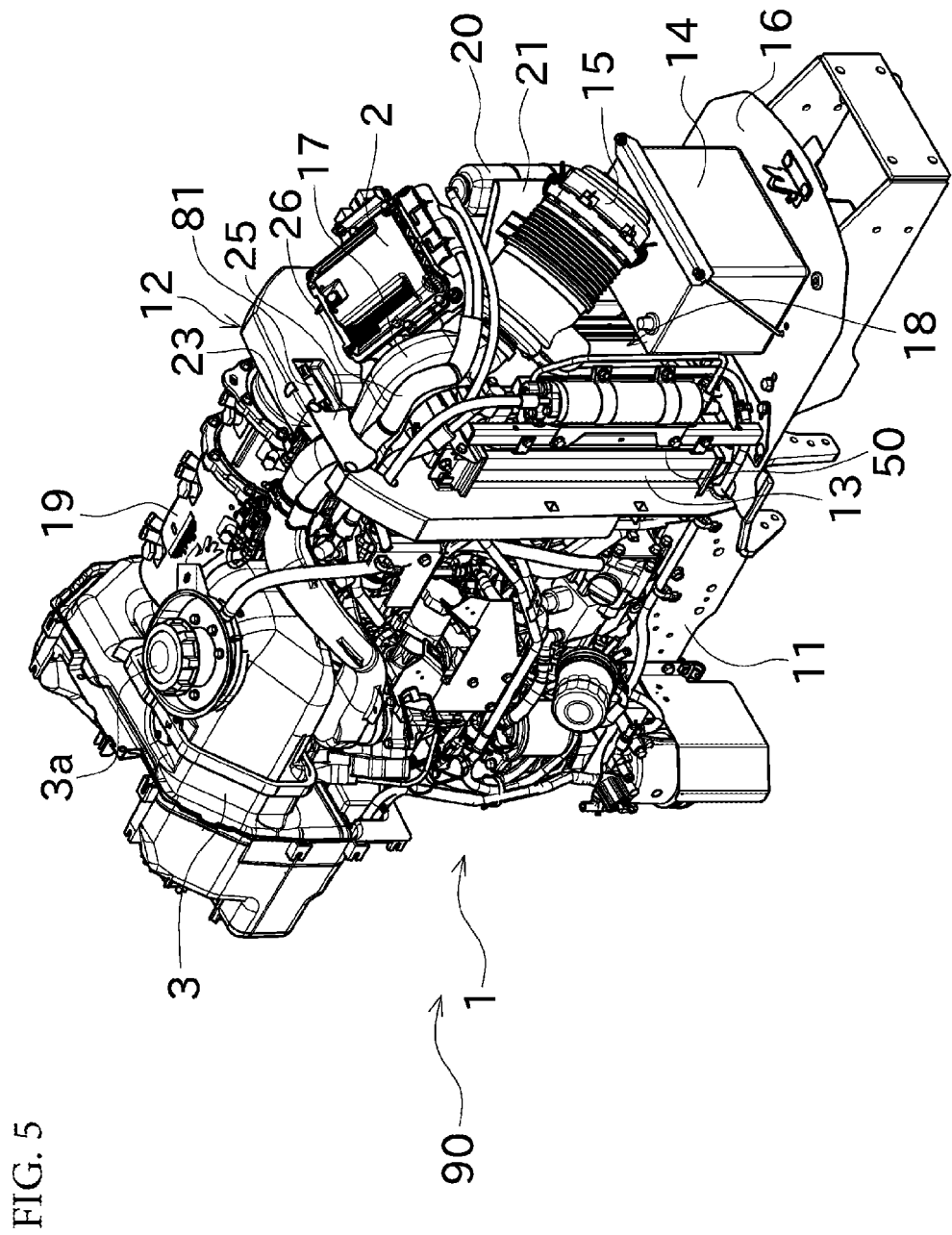
FIG. 5 A perspective view illustrating the state inside the hood.
Figure 6:
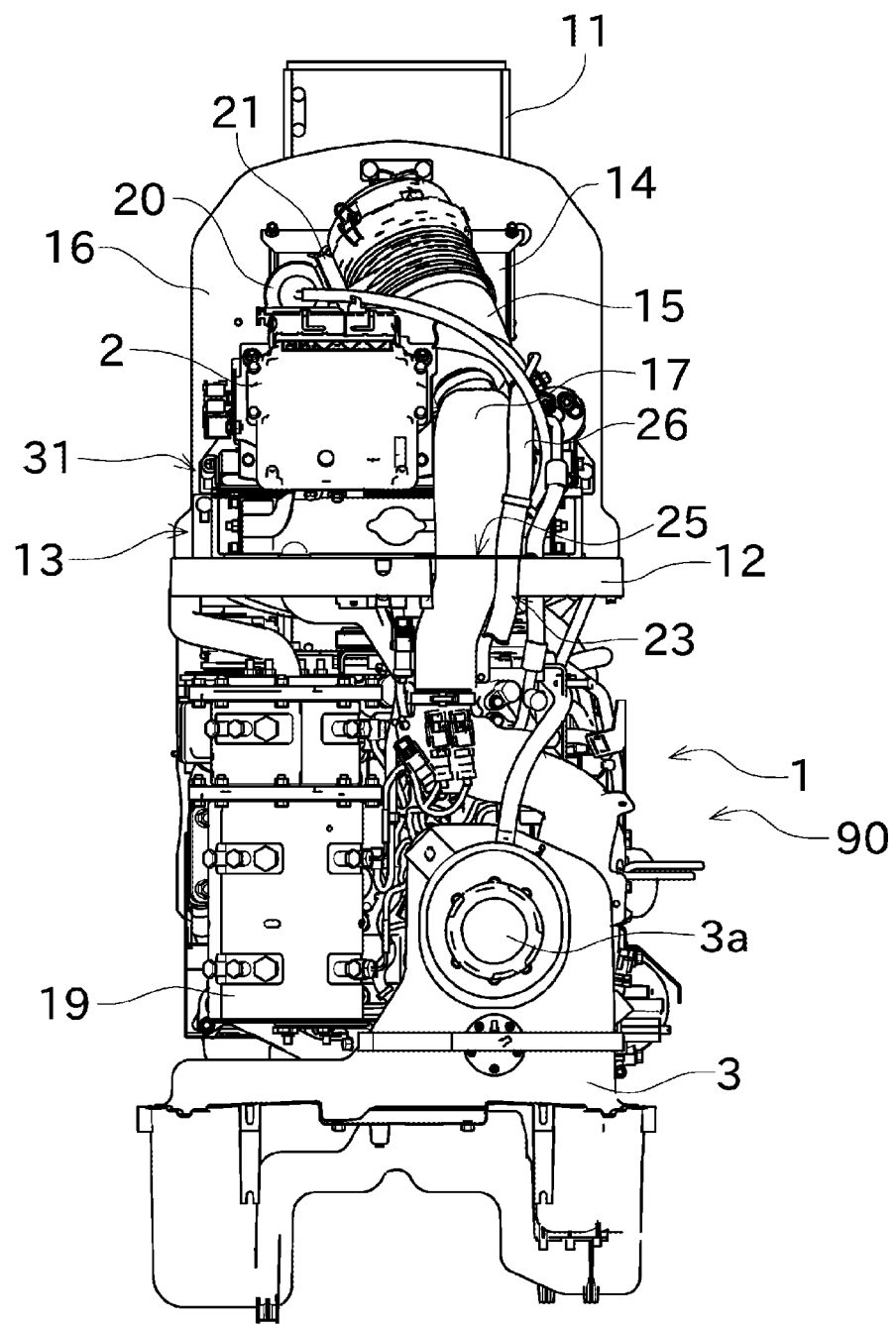
FIG. 6 A plan view illustrating the state inside the hood.
Figure 7:
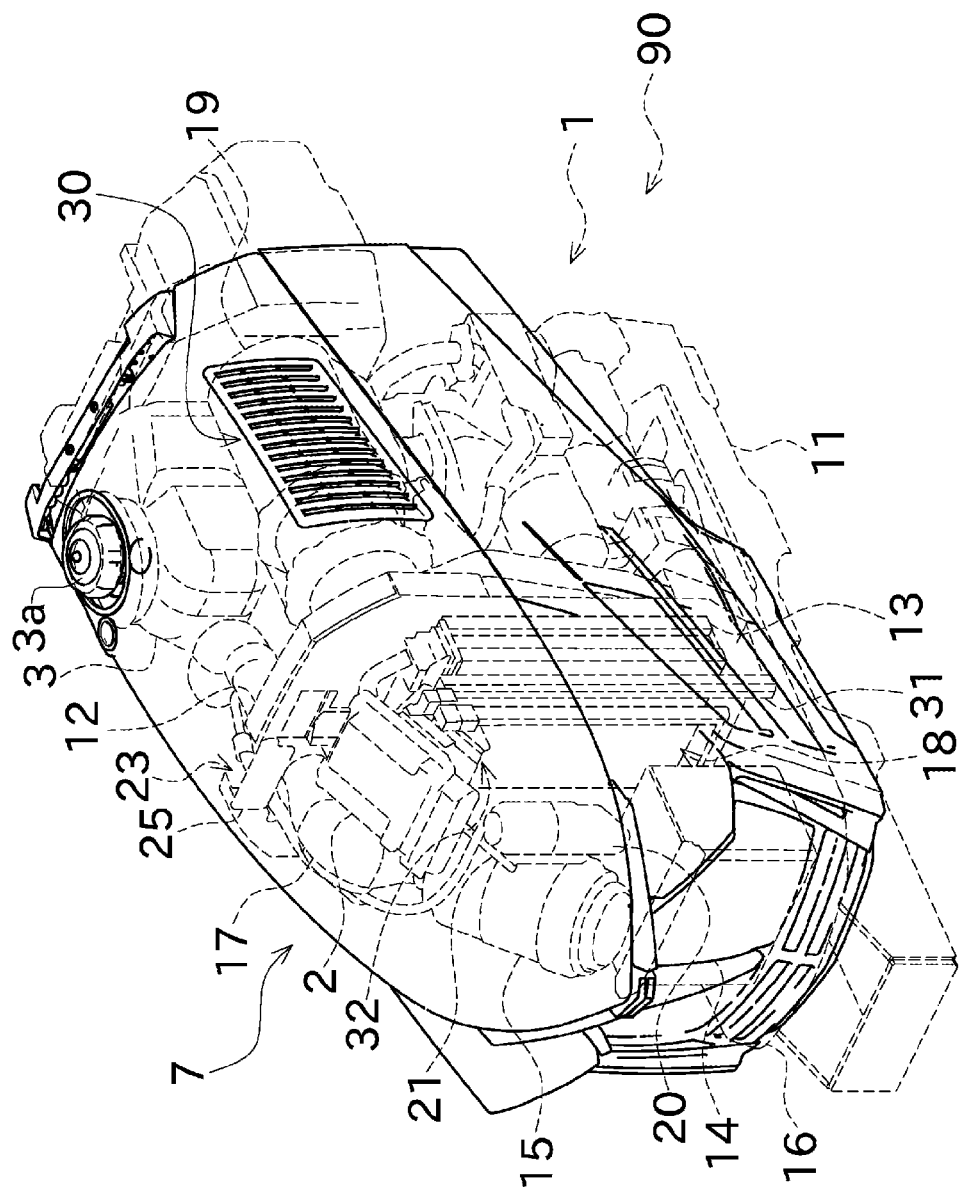
FIG. 7 A perspective view illustrating a positional relationship between the hood and an internal configuration of the hood.

With reference now to FIGS. 2 through 7, arrangement of components in the hood 7 will be described. FIG. 2 is a right side view illustrating a state inside the hood 7 of the tractor 6 according to this embodiment. FIG. 3 is a perspective view of the inside of the hood 7. FIG. 4 is a left side view of the inside of the hood 7. FIG. 5 is a perspective view of the inside of the hood 7. FIG. 6 is a plan view of the inside of the hood 7. FIG. 7 is a perspective view illustrating a positional relationship between the hood 7 and an internal configuration of the hood 7.

The engine body 1 is disposed above the engine frame 11. A DPF 19 is disposed in an upper left portion of the engine body 1. An oil supply tank 3 is disposed in an upper portion of the engine body 1 to be adjacent to the DPF 19. A fan shroud (partition plate) 12 is disposed immediately ahead of the engine body 1. The fan shroud 12 is disposed to separate the engine body 1 disposed in a rear portion of the hood 7 from devices and components disposed in a front portion of the hood 7. A radiator 13, a condenser 18, an engine controller 2, a battery 14, an air cleaner 15, and a sub-tank 20 are disposed further ahead of the fan shroud 12 (corresponding to a front portion of an inner space of the hood 7). Devices and components disposed in portions from a center portion to the front portion of the hood 7 are arranged on the upper surface of a plate-shaped attachment plate 16 fixed to the engine frame 11.

An unillustrated cooling fan is disposed in the fan shroud 12 and is driven by receiving a driving force from the engine body 1. Rotation of the cooling fan causes relatively low-temperature outdoor air to be taken from an unillustrated front grille in the front surface of the hood 7, and the outdoor air is sent to the engine body 1 through the radiator 13 and the cooling fan to thereby cool the engine body 1.

The fan shroud 12 is configured to divide the inner space of the hood 7 into front and rear spaces. Accordingly, devices and members disposed ahead of the fan shroud 12 (e.g., the radiator 13 and the condenser 18) can be shielded against heat from the engine body 1 and the DPF 19.

The fan shroud 12 is made of a synthetic resin and is formed into a shape having a notch 23 through which an intake pipe 17 and engine harnesses 26 pass. A closing sheet 25 that can be easily detached is attached to the upper end of the front surface of the fan shroud 12 to cover an opening of the notch 23 of the fan shroud 12. In this manner, even upon application of a vibration or an impact to the tractor 6, the intake pipe 17 and other members passing through the notch 23 can be retained within a predetermined range so as not to come out of the notch 23. This configuration can ease maintenance of members such as the intake pipe 17 while keeping high levels of an air-guide effect of efficiently taking outdoor air for cooling the engine body 1 and a shielding effect of inhibiting heat transfer from the engine body 1 toward devices ahead.

The engine harnesses 26 electrically connect components of the engine body 1 to the engine controller 2. The engine harnesses 26 are supported by ribs 17a (see FIG. 11) formed along the longitudinal direction of the intake pipe 17. In this manner, the number of components can be reduced as compared to a configuration in which an additional stay or the like for supporting the engine harnesses 26 is provided, and the engine harnesses 26 can be disposed along the intake pipe 17 so that the engine harnesses 26 can be disposed in a small space.

The DPF 19 is provided to an exhaust pipe, and is configured to collect and remove particulate matter (PM) emitted from the engine body 1. It should be noted that the amount of PM collected by the DPF 19 increases with an operation of the engine, and thus, when a predetermined amount of the PM collected by the DPF 19 is accumulated, the exhaust temperature of the engine body 1 is controlled to increase so that the PM is burnt at high temperatures in the DPF 19, and thereby, clogging of the filter is prevented (DPF regeneration).

In performing the DPF regeneration, for example, the DPF 19 can generate a large amount of heat in some cases, and might cause heat damage on equipment disposed around the DPF 19. To prevent this, as illustrated in FIG. 7, exhaust holes 30 are formed to be located near the DPF 19 while the hood 7 is closed. This configuration can enhance efficiency of heat exhaust from the inside of an engine room to the outside of the hood 7 to prevent problems due to high temperature from occurring in devices and components in the engine room.

The fan shroud 12 supports a pressure difference sensor 81 that detects a pressure difference between upstream and downstream sides of the filter of the DPF 19. Spaces upstream and downstream of the filter in the DPF 19 are connected to the pressure difference sensor 81 through appropriate pipes. In this manner, it is unnecessary to additionally provide a dedicated member for supporting the pressure difference sensor 81. Thus, the configuration of the tractor 6 can be simplified so that costs can be reduced.

The radiator 13 is configured as a heat exchanger. An unillustrated circulation path in which cooling water circulates is formed between the radiator 13 and an unillustrated water jacket formed in the engine body 1. Cooling water in the water jacket whose temperature has become high because of heat generation of the engine body 1 is sent to the radiator 13. The cooling water is cooled by outdoor air taken from the front grille while passing through the radiator 13, and then returns to the water jacket to cool the engine body 1.

The condenser 18 is configured as a heat exchanger, and is used for an air conditioner that performs air conditioning in the cabin 10. The condenser 18 is supported by a condenser frame (first support member) 31 and is attached ahead of the radiator 13.

The engine controller 2 is configured as a small-size computer, and the engine body 1 and the engine controller 2 constitute an engine. Based on information from various sensors attached to the engine body 1, for example, the engine controller 2 outputs control instructions for controlling the amount of fuel injection, the timing of fuel injection, and so forth, to various actuators (including the injector included in the engine body 1) to thereby control the engine.

The engine controller 2 is supported with interposition of a vibration-isolating support structure 35 composed of a plurality of vibration-isolating rubber members 33. Specifically, a support plate 32 is attached to an upper portion of the arch-shaped condenser frame 31 supporting the condenser 18, and the vibration-isolating support structure 35 is disposed on the support plate 32. Some of the plurality of vibration-isolating rubber members 33 are oriented perpendicularly to the thickness direction of the engine controller 2, and the other vibration-isolating rubber members 33 are oriented in parallel with the thickness direction of the engine controller 2. Through the vibration-isolating rubber members 33, the engine controller 2 is fixed to the support plate 32.

Since the engine controller 2 is disposed at a level higher than the condenser 18 in the hood 7, the operator can easily access the engine controller 2 while the hood 7 is open. This configuration can prevent a vibration and an impact applied to the engine controller 2 and ease maintenance of the engine controller 2.

The battery 14 supplies electric power to various electric components included in the tractor 6 (e.g., a cell motor included in the engine body 1, headlights of the tractor 6, and the engine controller 2).

The air cleaner 15 is configured to house an air cleaner element for removing foreign matter in the air. The air cleaner 15 is connected to the engine body 1 through the intake pipe 17, and constitutes a part of an intake structure of the engine body 1. The intake pipe 17 extending from the engine body 1 passes through the notch 23 formed in the fan shroud 12 in the front-rear direction (longitudinal direction), and passes above the radiator 13 and then bends downward to be connected to the air cleaner 15.

The sub-tank 20 is configured as a container that is connected to the radiator 13 through a pipe and is slender in the vertical direction, and is configured to store an overflowed part of cooling water in the radiator 13. When the amount of cooling water in the radiator 13 increases by thermal expansion, the cooling water in the radiator 13 flows into the sub-tank 20, whereas when the amount of cooling water in the radiator 13 decreases, cooling water in the sub-tank 20 is caused to return to the radiator 13. In this manner, the cooling water in the radiator 13 can be maintained in a predetermined amount.

The air cleaner 15 and the sub-tank 20 are respectively fixed to the left and right sides of a support bracket 21 having a flat-plate shape and having the thickness direction thereof oriented in the horizontal direction. In this manner, no special fixing members for fixing the air cleaner 15 and the sub-tank 20 are necessary so that the number of components can be reduced, and thereby, costs can be reduced.

The oil supply tank 3 is disposed above the engine body 1. The oil supply tank 3 has a filler opening (cap) 3a through which refueling is performed. The filler opening 3a of the oil supply tank 3 is disposed to project from an opening formed in an upper portion of the hood 7 so that the operator can perform refueling independently of whether the hood 7 is open or closed.

Figure 8:
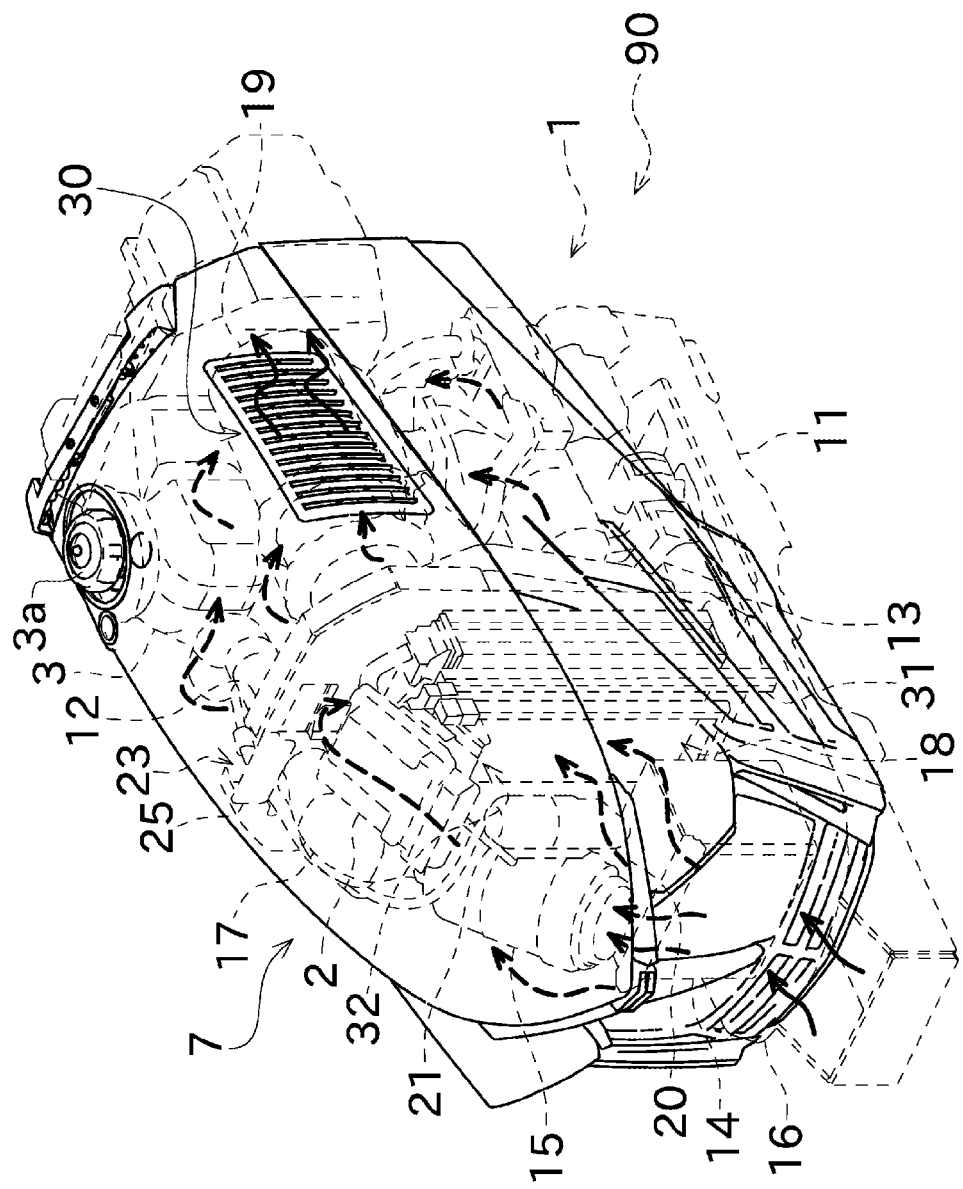
FIG. 8 A perspective view schematically illustrating an air flow inside the hood.

With reference now to FIG. 8, a main air flow formed in the hood 7 will be described. FIG. 8 is a perspective view schematically illustrating an air flow inside the hood 7.

Air at a relatively low temperature that has flowed from the unillustrated front grille in the front surface of the hood 7 is partially taken in the air cleaner 15, and flows to the engine body 1 by way of the intake pipe 17. A part of air not taken in the air cleaner 15 flows along the upper and lower surfaces of the engine controller 2 disposed to extend forward and downward from space above the condenser 18, and efficiently cools the engine controller 2. Since the engine controller 2 is disposed to rise rearward and the inner wall of a portion of the hood 7 covering space above the engine controller 2 is also disposed to rise rearward, the air smoothly flows around the engine controller 2.

With the air-guide effect of the fan shroud 12 described above, most part of air that has been taken through the front grille and is not sucked in the air cleaner 15 (including the air that has flowed around the engine controller 2 as described above) passes through the condenser 18 and the radiator 13 disposed to cover the front surface of an air inlet (cavity 27 illustrated in FIGS. 11 and 12) formed at the center of the fan shroud 12. In this manner, refrigerant of the air conditioner and cooling water of the engine can be cooled by heat exchange.

Air that has passed through the radiator 13 is sent rearward by the unillustrated cooling fan disposed in the fan shroud 12. Thereafter, the air strikes the front surface of the engine body 1 to expand radially, and then flows rearward in spaces above and at the left and right of the engine body 1. Accordingly, the engine body 1 can be efficiently cooled. Air flowing along the left side surface of the engine body 1 smoothly flows along the longitudinal direction of the DPF 19, and as a result, the DPF 19, which tends to be at high temperatures, can be efficiently cooled. Air that has flowed rearward of the fan shroud 12 takes heat from the engine body 1 and the DPF 19 to thereby become relatively high-temperature air, and most part of the air is exhausted out of the hood 7 from the exhaust holes 30 formed at a position of the hood 7 substantially facing the DPF 19 in the lateral direction. Accordingly, air that is at a high temperature because of passage near the DPF 19 can be easily immediately exhausted from the exhaust holes 30 so that it is possible to prevent the high-temperature air from remaining in the hood 7 for a long time to reduce the cooling effect.

During work of the tractor 6, foreign matter such as weeds, straw scraps, and dust can enter the radiator 13 together with the flow of air taken into the radiator 13. When the entering of the foreign matter causes clogging of the fin of the radiator 13, the cooling effect of the radiator 13 decreases.

To prevent occurrence of the clogging, the tractor 6 according to this embodiment includes a dust screen (dust-proof member) 50 disposed on the surface (front surface) of the radiator 13 facing the air intake side so that the dust screen 50 catches the foreign matter to prevent the foreign matter from flowing into the radiator 13.

When the foreign matter is deposited on the dust screen 50 to cause clogging, the air flowability decreases. Thus, the dust screen 50 needs to be cleaned at an appropriate timing. In view of this, in this embodiment, to easily clean the dust screen 50, the dust screen 50 is detachably attached to the radiator 13.

Figure 9:
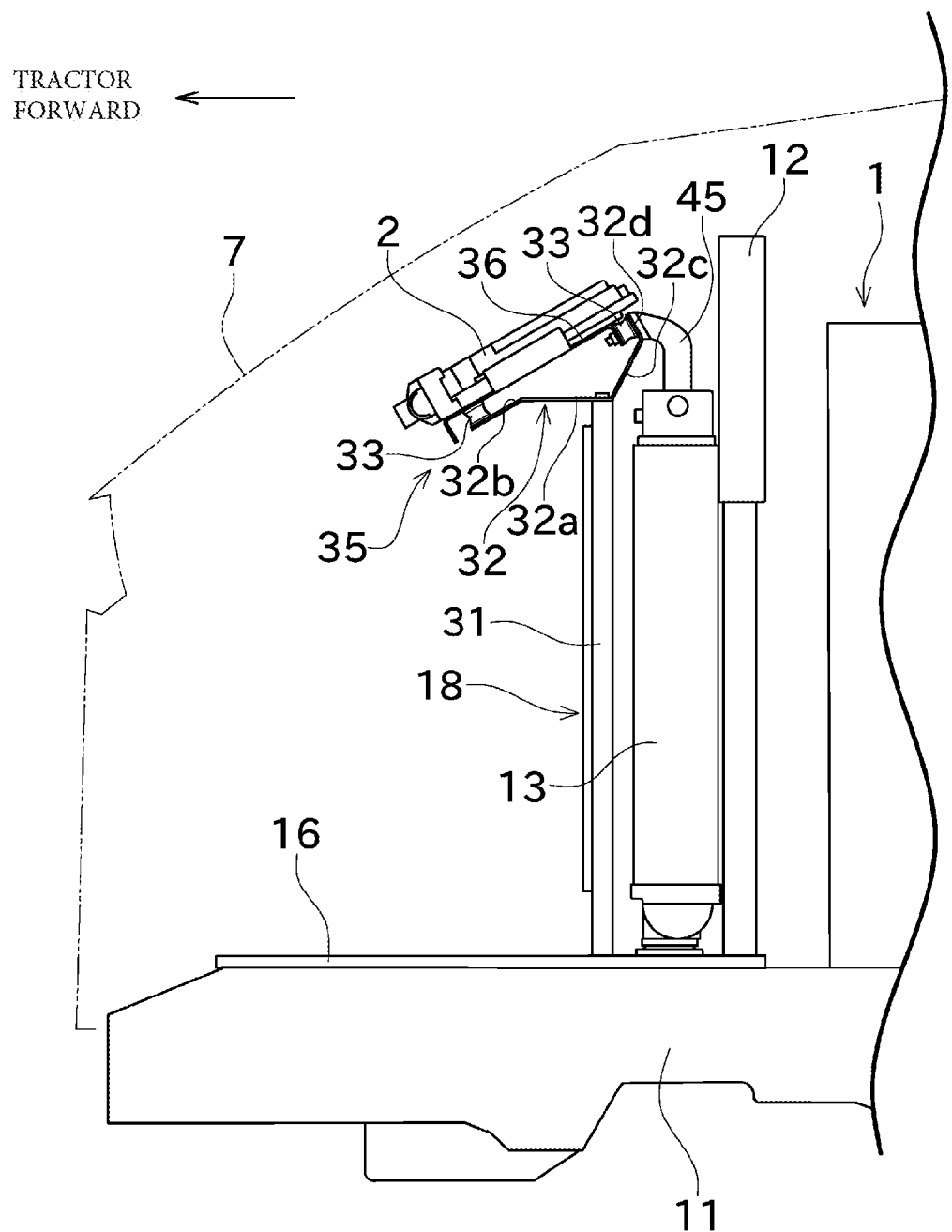
FIG. 9 A right side view schematically illustrating a state near an engine controller.

With reference now to FIGS. 2 through 9, arrangement of the engine controller 2 will be described. FIG. 9 is a right side view schematically illustrating a state near the engine controller 2.

The fan shroud 12, the radiator 13, and the condenser 18 (condenser frame 31), for example, are disposed on the upper surface of the plate-shaped attachment plate 16 horizontally fixed to the engine frame 11. Each of the fan shroud 12, the radiator 13, and the condenser 18 has substantially a flat plate shape, and has its thickness direction oriented in the longitudinal direction.

As illustrated in FIGS. 2 and 4, in a side view, the condenser 18 is disposed behind the battery 14, and the radiator 13 is disposed behind the condenser 18. In a side view, the air cleaner 15 is disposed above the battery 14.

In a side view, the engine controller 2 is disposed above the air cleaner 15. To avoid interference between the intake pipe 17 and the engine controller 2, the intake pipe 17 is disposed to relatively lean toward one of the left and right (right in this embodiment).

A support plate (second support member) 32 is disposed above the condenser 18. Specifically, the support plate 32 is attached to an upper portion of the arc-shaped condenser frame 31 supporting the condenser 18. An upper portion of the support plate 32 supports the engine controller 2 with interposition of the vibration-isolating support structure 35 composed of the plurality of vibration-isolating rubber members 33.

As illustrated in FIGS. 2 and 4, the engine controller 2 is disposed in the hood 7 at a level higher than the condenser 18, the air cleaner 15, and the radiator 13. Consequently, while the hood 7 is open, the operator can easily access the engine controller 2.

The engine controller 2 has substantially a flat plate shaped with a certain thickness and is disposed to decline forward. As described above, the engine controller 2 is disposed in a front upper portion of the inner space of the hood 7. Consequently, in the case where the shape of the front portion of the hood 7 declines forward as described above, arrangement of the engine controller 2 can be made compact along an end of the inner space of the hood 7 as illustrated in FIG. 9. Accordingly, a large space can be obtained for arrangement of other devices and components in the hood 7.

Figure 10:
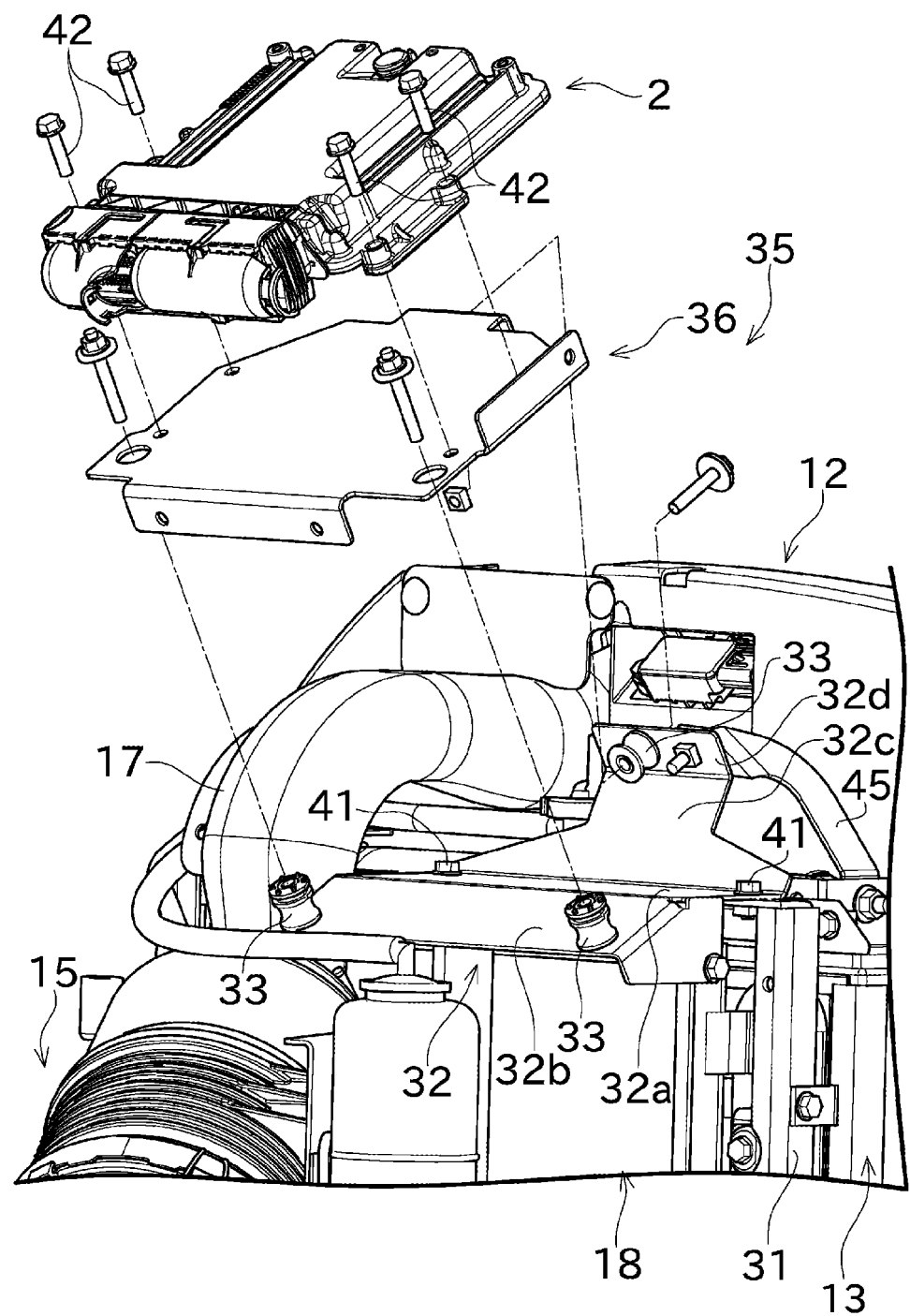
FIG. 10 A disassembled perspective view illustrating a vibration-isolating support structure of the engine controller.

Next, the vibration-isolating support structure 35 supporting the engine controller 2 will be described in detail with reference to FIGS. 9 and 10. FIG. 10 is a disassembled perspective view illustrating the vibration-isolating support structure 35 of the engine controller 2.

As illustrated in FIG. 9, the support plate 32 is formed by bending a metal plate at three points in a side view. As illustrated in FIGS. 9 and 10, a center portion 32a at substantially the center of the support plate 32 in the longitudinal direction is oriented substantially horizontally. As illustrated in FIG. 10, the center portion 32a is attached to the upper end of the condenser frame 31 with bolts 41.

In the support plate 32, a first support portion 32b is integrally connected to the front of the center portion 32a. The boundary between the center portion 32a and the first support portion 32b is bent, and consequently, the first support portion 32b slightly declines forward. Two left and right vibration-isolating rubber members 33 are arranged side by side on the upper surface of a front end portion of the first support portion 32b.

In the support plate 32, a rising portion 32c is integrally connected to the rear end of the center portion 32a. The boundary between the center portion 32a and the rising portion 32c is bent, and consequently, the rising portion 32c declines forward. It should be noted that as illustrated in FIG. 9, the tilt of the rising portion 32c is slightly larger than the tilt of the first support portion 32b. As illustrated in FIG. 10, the rising portion 32c is formed to gradually become narrow toward the top (rear).

In the support plate 32, a second support portion 32d is integrally connected to the upper end (rear end) of the rising portion 32c. The boundary between the rising portion 32c and the second support portion 32d is bent, and consequently, the second support portion 32d inclines toward the front (where the second support portion 32d is oriented substantially vertical to the first support portion 32b). One vibration-isolating rubber member 33 is disposed on the surface of the second support portion 32d facing downward (forward).

A coupling bracket 45 is fixed to the upper end of the radiator 13 disposed behind the condenser frame 31 (condenser 18). The coupling bracket 45 extends forward and upward from a portion fixed to the radiator 13 toward the second support portion 32d of the support plate 32, and has its front end fixed to the second support portion 32d. Accordingly, as compared to a configuration in which the support plate 32 is fixed only to the condenser frame 31, the support plate 32 can be attached with stability.

A mount plate 36 for attaching the engine controller 2 is disposed above the support plate 32. The mount plate 36 is configured as a flat-plate shaped member oriented substantially in parallel with the first support portion 32b disposed in a front portion of the support plate 32. The mount plate 36 is attached to the support plate 32 through two vibration-isolating rubber members 33 disposed on the first support portion 32b and one vibration-isolating rubber member 33 disposed on the second support portion 32d.

As illustrated in FIG. 10, a flat mount surface is formed in the upper surface of the mount plate 36. The engine controller 2 is attached to the mount surface with bolts 42 serving as fixtures.

The two vibration-isolating rubber members 33 disposed on the front portion of the support plate 32 are disposed in a direction parallel to the thickness direction of the engine controller 2 (thickness direction of the mount plate 36). The vibration-isolating rubber member 33 disposed on the rear portion of the support plate 32 is disposed in a direction perpendicular to the thickness direction of the engine controller 2 (thickness direction of the mount plate 36). Such combination of the vibration-isolating rubber members 33 oriented in different directions can stably reduce vibrations and impacts transmitted to the engine controller 2 in various directions. With the configuration in which some of the plurality of vibration-isolating rubber members 33 are parallel to the thickness direction of the engine controller 2 and the other vibration-isolating rubber members 33 are vertical to the thickness direction, arrangement of the entire vibration-isolating support structure 35 can be made compact.

Next, arrangement of the engine body 1 and the engine controller 2 and an influence of heat from the engine body 1 to the engine controller 2 will be described in detail with reference to FIG. 9.

In the hood 7, the configurations of the condenser 18 (condenser frame 31), the radiator 13, the fan shroud 12, and the engine body 1 are arranged in this order from the front to the rear in a side view. The support plate 32 is disposed below the engine controller 2, and the condenser frame 31 is disposed below the support plate 32. In this manner, the engine controller 2 and the engine body 1 can be sufficiently separated from each other, and members such as the fan shroud 12, the radiator 13, and the condenser 18 are laid out between the engine controller 2 and the engine body 1. Consequently, the influence of heat transferred from the engine body 1 to the engine controller 2 can be reduced.

The fan shroud 12, which is a member between the engine controller 2 and the engine body 1, is disposed to cover a wide range of the front surface of the engine body 1 as illustrated in, for example, FIGS. 3 and 5, and partitions the inner space of the hood 7 into front and rear spaces. Accordingly, heat transfer from the engine body 1 to the engine controller 2 can be suppressed so that malfunction of the engine controller 2, for example, can be prevented.

As described above, the tractor 6 according to this embodiment includes the engine body 1, the condenser frame 31, the support plate 32, and the engine controller 2. The condenser frame 31 is disposed ahead of the engine body 1. The support plate 32 is fixed to the condenser frame 31. The engine controller 2 is supported by the support plate 32 with the vibration-isolating rubber members 33 interposed therebetween. The support plate 32 is disposed above the condenser frame 31. The engine controller 2 is disposed above the support plate 32.

Accordingly, vibrations and impacts on the engine controller 2 can be reduced so that abnormality does not easily occur in operation of the engine controller 2. In addition, the operator can easily access the engine controller 2 while the hood 7 is open, and thus, maintenance of the engine controller 2 can be easily performed.

In the tractor 6 according to this embodiment, the engine controller 2 is disposed to decline forward.

Accordingly, in the case where the shape of the front portion of the hood 7 declines forward as in this embodiment, arrangement of the engine controller 2 can be made compact along the inner wall of the hood 7. Thus, the inner space of the hood 7 can be efficiently used.

In the tractor 6 according to this embodiment, the engine controller 2 is formed in a substantially flat plate shape. The plurality of vibration-isolating rubber members 33 are provided. Some of the plurality of vibration-isolating rubber members 33 are oriented perpendicularly to the thickness direction of the engine controller 2, and the other vibration-isolating rubber members 33 are oriented in parallel with the thickness direction of the engine controller 2.

Accordingly, vibrations and impacts in various directions can be stably reduced by using a combination of vibration-isolating rubber members 33 oriented in different directions. As a result, abnormality of operation of the engine controller 2 can be prevented.

The tractor 6 according to this embodiment includes the radiator 13 disposed ahead of the engine body 1. The engine controller 2 is disposed farther from the engine body 1 than the radiator 13 is.

Accordingly, a layout in which heat is not easily transferred from the engine body 1 to the engine controller 2 can be achieved so that abnormality does not easily occur in operation of the engine controller 2.

In the tractor 6 according to this embodiment, the fan shroud 12 is disposed between the engine controller 2 and the engine body 1.

Accordingly, heat transfer from the engine body 1 to the engine controller 2 can be effectively prevented by the fan shroud 12 so that stable operation of the engine controller 2 can be achieved.

Figure 11:
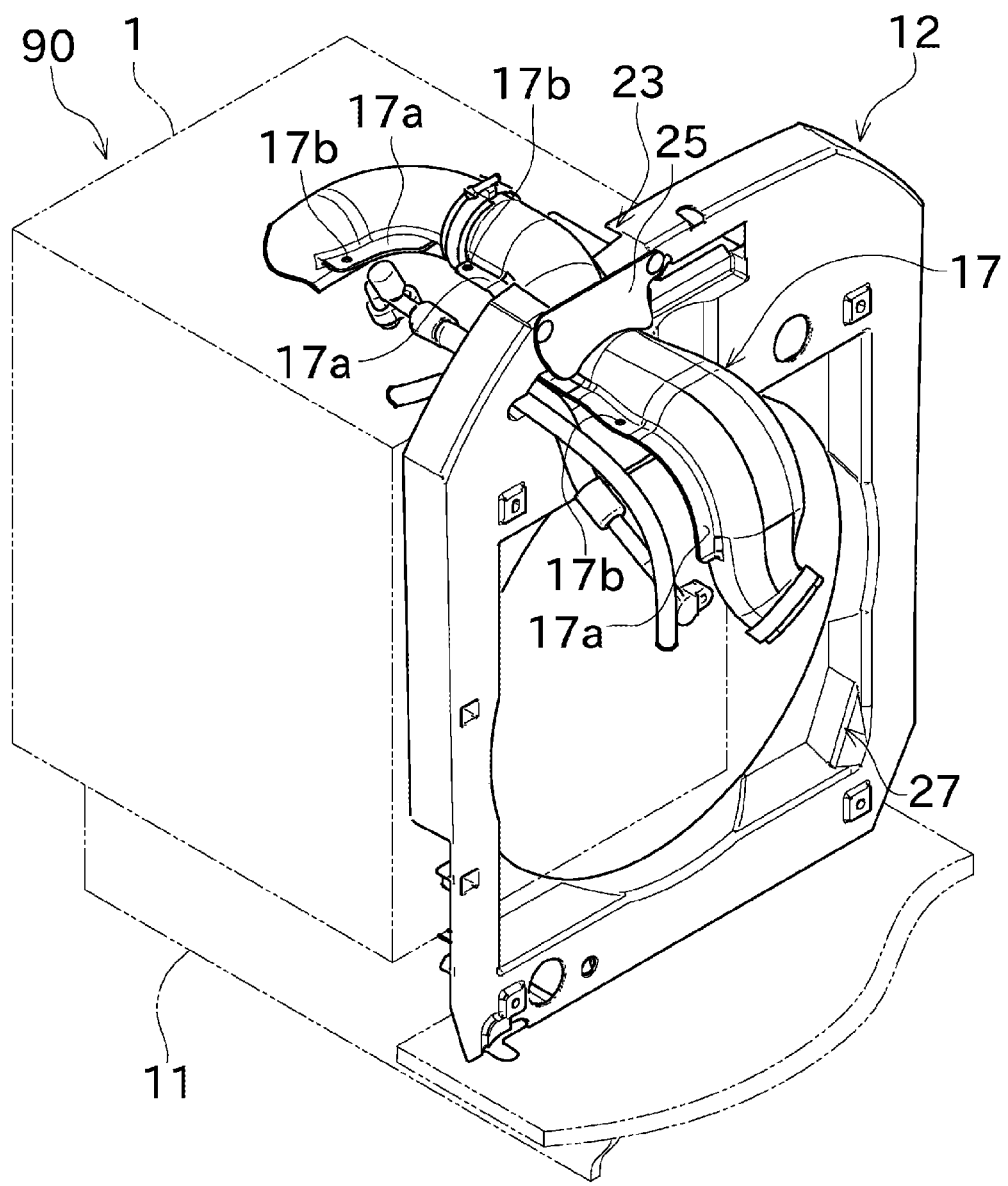
FIG. 11 A front perspective view illustrating a state in which an intake pipe penetrates a fan shroud.
Figure 12:
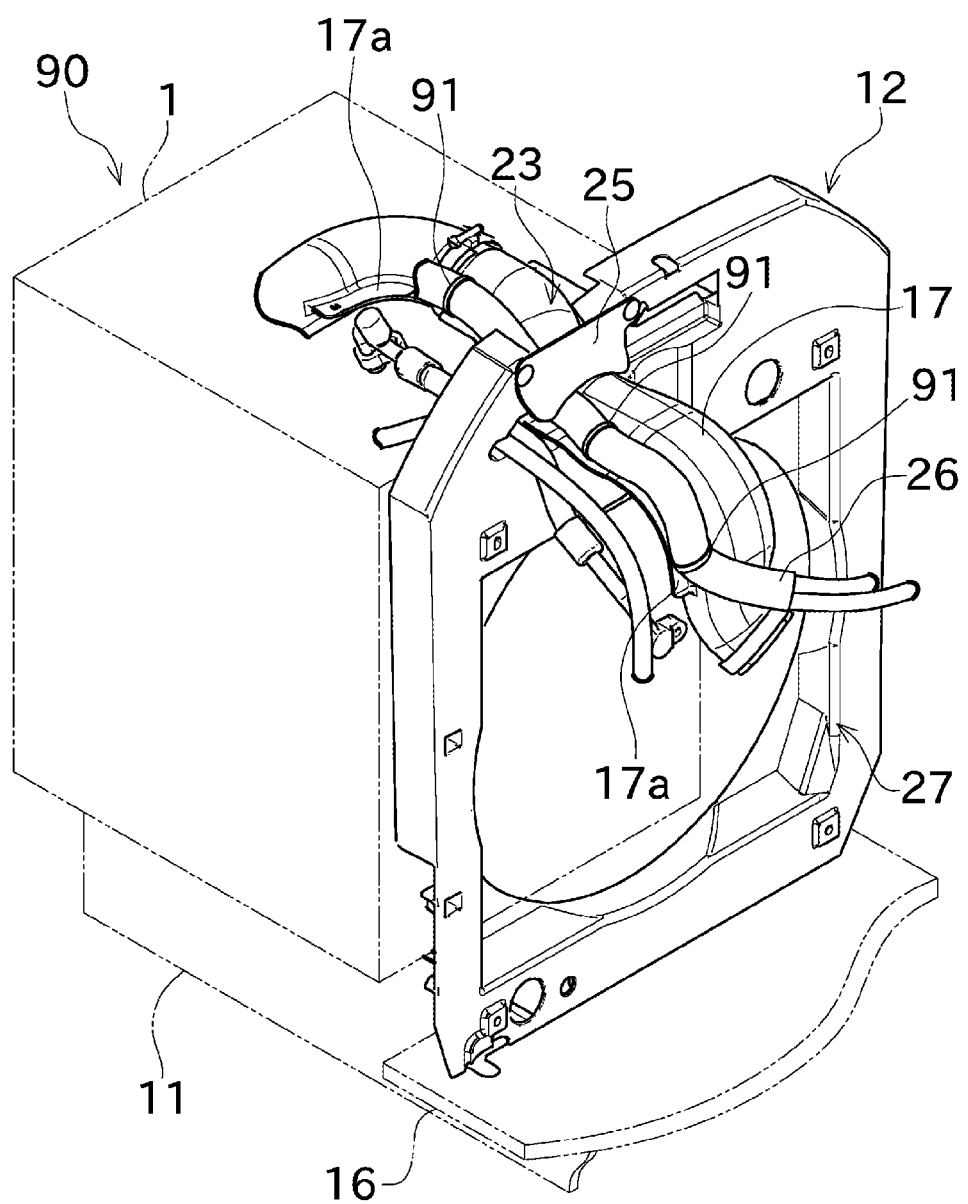
FIG. 12 A front perspective view illustrating a state in which engine harnesses are attached to the intake pipe.

With reference now to FIGS. 11 through 15, configurations of the intake pipe 17, the engine harnesses 26, and members accompanying the intake pipe 17 and the engine harnesses 26 will be specifically described. FIG. 11 is a front perspective view illustrating a state in which the intake pipe 17 penetrates the fan shroud 12. FIG. 12 is a front perspective view illustrating a state in which the engine harnesses 26 are attached to the intake pipe 17 in the state of FIG. 11.

The intake pipe 17 illustrated in FIG. 11 constitutes a passage in which intake air cleaned by the air cleaner 15 (see, for example, FIGS. 2 and 3) to an intake unit (e.g., intake manifold) of the engine body 1. The intake pipe 17 according to this embodiment is a substantially flat pipe whose cross section is similar to a deformed circle, and connects the air cleaner 15 and the intake unit of the engine body 1. As illustrated in FIG. 11, the intake pipe 17 includes the plate-shaped ribs 17a formed along the longitudinal direction of the intake pipe 17 (inflow direction of intake air). The ribs 17a in this embodiment are slender along the longitudinal direction of the intake pipe 17, and project horizontally to the right, and intermittently extend in the longitudinal direction. The ribs 17a of the intake pipe 17 have an attachment hole 17b that is used for inserting an attachment bolt 95 described later. The attachment hole 17b penetrates the ribs 17a.

The engine harnesses 26 illustrated in, for example, FIGS. 5 and 12 are electric wire harnesses routed for electrically connecting components of the engine body 1 to the engine controller 2. The engine harnesses 26 branch at one end (front end) to be connected to the engine controller 2. The engine harnesses 26 branch at the other end (rear end) to be connected to the engine body 1. As illustrated in FIGS. 5 and 12, intermediate portions (intermediate portions between the front end and the rear end) of the engine harnesses 26 are bundled by bind members 91 at a plurality of separate positions. In this embodiment, the plurality of harnesses are housed as a unit in a corrugated tube, and the bind members 91 are wound onto the corrugated tube. As will be described in detail later, the longitudinally intermediate portions of the engine harnesses 26 are supported by the ribs 17a of the intake pipe 17 with the bind members 91 interposed therebetween.

Figure 13:
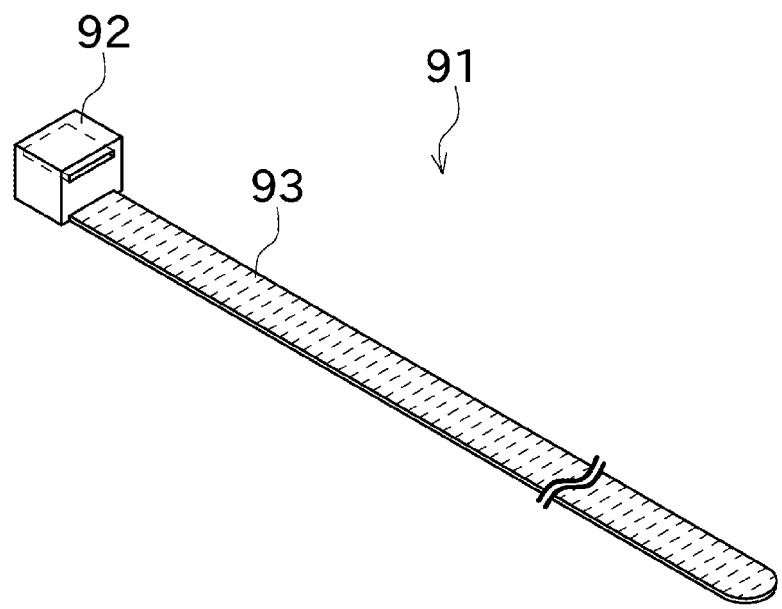
FIG. 13 A view illustrating a configuration of a bind member.

As illustrated in FIG. 13, the bind members 91 according to this embodiment are constituted by known binding bands made of a synthetic resin. FIG. 13 is a view illustrating a configuration of one of the bind members 91 according to this embodiment. That is, each of the bind members 91 includes a small head 92 and a flexible slender band part 93 extending from the head 92. The head 92 includes an unillustrated engaging portion therein, and the band part 93 includes an engaged portion constituted by a plurality of projections arranged in the longitudinal direction.

When the band part 93 is inserted from the front end into the engaging portion of the head 92, the engaged portion of the band part 93 is engaged with the engaging portion of the head 92 so that the bind member 91 is formed into a "P" shape. The engine harnesses 26 are located in the loop of the P shape so that the engine harnesses 26 can be bundled.

In the state where the engaged portion of the band part 93 is engaged with the engaging portion of the head 92, the band part 93 can move relative to the head 92 in a direction in which the diameter of the loop decreases (the bundle becomes tighter), but cannot move in the opposite direction in which the diameter increases (the bundle becomes looser).

Figure 14:
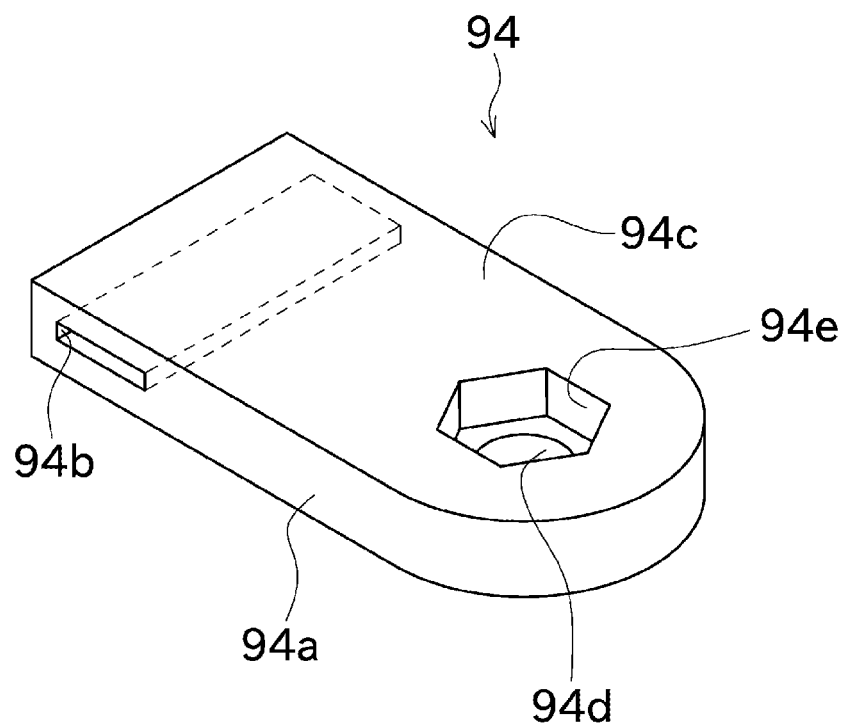
FIG. 14 A view illustrating a configuration of a fixing member.

Before the band part 93 is inserted from the front end into the head 92 to bundle the engine harnesses 26, a fixing member 94 illustrated in FIG. 14 is attached to the band part 93 of the bind members 91 beforehand.

The fixing member 94 is attached to the band part 93 of the bind member 91. FIG. 14 is a perspective view illustrating a configuration of the fixing member 94 according to this embodiment. In this embodiment, the fixing member 94 is configured as a slender plate-shaped member having a substantially rectangular shape with a uniform thickness. One longitudinal end of the fixing member 94 has an angular rectangular shape and the other longitudinal end is rounded in a semicircular shape.

The one longitudinal end of the fixing member 94 has a first hole 94b that is open at each of a pair of side surfaces 94a and 94a of the fixing member 94 and has a rectangular cross section. The first hole 94b penetrates the fixing member 94 perpendicularly to the thickness direction of the fixing member 94. The cross-sectional shape of the first hole 94b is a slender rectangle corresponding to the cross-sectional shape of the band part 93 of the bind member 91. One end of the fixing member 94 in the thickness direction is a harness placement surface 94c on which the engine harnesses 26 are placed.

The other longitudinal end of the fixing member 94 has a second hole 94d that penetrates the fixing member 94 in the thickness direction and has a circular cross section. An upper portion (a portion near the harness placement surface 94c) of the second hole 94d has a recess 94e having a hexagonal cross section. The recess 94e can house a hexagonal head of the attachment bolt (shaft member) 95.

Figure 15:
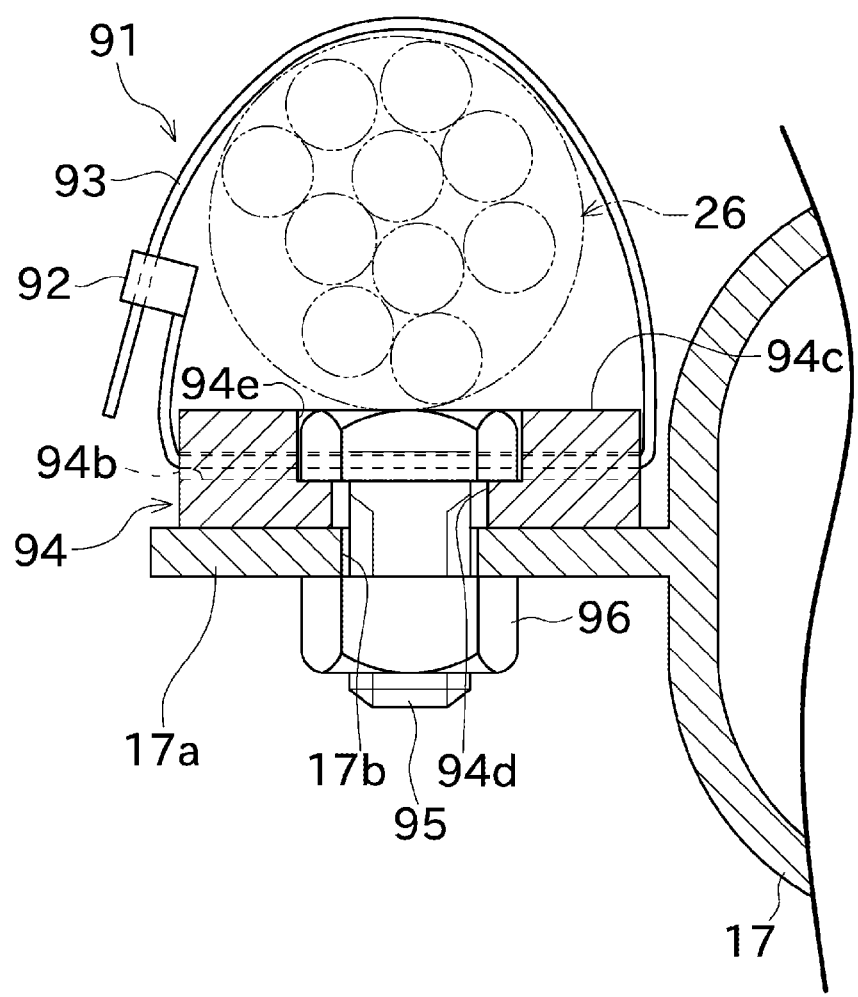
FIG. 15 A cross-sectional view illustrating a state in which engine harnesses are attached to a rib of an intake pipe with the bind member and the fixing member interposed therebetween.

Next, a method for attaching the engine harnesses 26 to the ribs 17a of the intake pipe 17 through the fixing member 94 and the bind members 91 will be described in detail. FIG. 15 is a cross-sectional view illustrating a state in which the engine harnesses 26 is attached to the ribs 17a of the intake pipe 17 through the bind member 91 and the fixing member 94.

First, the band part 93 of the bind members 91 is inserted into the first hole 94b of the fixing member 94 so that the fixing member 94 is attached to the bind member 91. In this state, the fixing member 94 is placed on the ribs 17a of the intake pipe 17, and while the position of the attachment hole 17b formed in the ribs 17a is matched with the position of the second hole 94d of the fixing member 94, the attachment bolt 95 is inserted in these holes from above. In this manner, the head of the attachment bolt 95 is housed in the recess 94e of the second hole 94d. Then, a nut (fastening member) 96 is attached to the attachment bolt 95 extending downward from the ribs 17a, and the nut 96 is rotated and tightened. In this manner, the fixing member 94 can be fixed to the ribs 17a of the intake pipe 17.

Thereafter, the engine harnesses 26 are placed on the harness placement surface 94c of the fixing member 94, and the band part 93 is inserted in the head 92 from the front end thereof so that the engine harnesses 26 are housed in the loop of the P shape of the bind member 91. In this manner, the engine harnesses 26 bundled by the bind member 91 are fixed to the ribs 17a of the intake pipe 17 through the fixing member 94.

In the manner described above, the engine harnesses 26 are fixed to the ribs 17a of the intake pipe 17 at a plurality of positions where the attachment holes 17b are formed in the ribs 17a of the intake pipe 17, and thereby, the engine harnesses 26 are supported by the intake pipe 17 while at least a part of the engine harnesses 26 extends along the longitudinal direction of the intake pipe 17 (more strictly, along the ribs 17a).

In particular, in a region opposite to (ahead of) the engine body 1 relative to the fan shroud 12, the engine harnesses 26 are attached to the ribs 17a of the intake pipe 17. Accordingly, as illustrated in FIG. 2, the engine harnesses 26 can be strategically routed by using space ahead of the fan shroud 12 and above the radiator 13 and the condenser 18.

The engine harnesses 26 that are attached to the ribs 17a of the intake pipe 17 penetrate the fan shroud 12 (together with the ribs 17a) through the notch 23. This routing can reduce the length of the engine harnesses 26 as compared to a case where the engine harnesses 26 are routed to bypass the fan shroud 12. With the configuration in which the closing sheet 25 closing the notch 23 is detachable, the engine harnesses 26 can be easily exposed to the outside of the fan shroud 12 so that maintenance of the engine harnesses 26 can be easily performed.

In addition, the engine harnesses 26 are disposed farther from the engine body 1 than the ribs 17a of the intake pipe 17 is. In other words, the engine harnesses 26 are disposed closer to the outside of the engine body 1 relative to the ribs 17a of the intake pipe 17. In this manner, the engine harnesses 26 are disposed at a position at which the operator can easily access the engine harnesses 26 while the hood 7 is open. Thus, maintenance of the engine harnesses 26 can be easily performed.

As described above, the tractor 6 according to this embodiment includes the engine body 1, the intake pipe 17, the engine controller 2, and the engine harnesses 26. The intake pipe 17 supplies intake air to the intake unit of the engine body 1. The engine controller 2 controls the engine body 1. The engine harnesses 26 electrically connects the engine body 1 and the engine controller 2 to each other. The intake pipe 17 includes the ribs 17a formed along the longitudinal direction of the intake pipe 17. The ribs 17a support at least a part of the engine harnesses 26.

In this manner, the engine harnesses 26 can be routed between the engine body 1 and the engine controller 2 by using the ribs 17a of the intake pipe 17. Accordingly, the number of components can be reduced as compared to the configuration in which an additional stay for supporting the engine harnesses 26 is provided, and thus, the weight of the engine 90 and manufacturing costs can be reduced. In addition, since the engine harnesses 26 are supported by the ribs 17a of the intake pipe 17, the engine harnesses 26 can be arranged along the intake pipe 17 so that the engine harnesses 26 can be placed in a small space.

In the tractor 6 according to this embodiment, the fan shroud 12 of the tractor 6 is disposed to separate the engine body 1 and the engine controller 2 from each other. The engine harnesses 26 are attached to the ribs 17a of the intake pipe 17 in a region opposite to the engine body 1 relative to the fan shroud 12.

In this manner, in the region opposite to the engine body 1 relative to the fan shroud 12, heat exchangers such as the radiator 13 and members such as the condenser 18 and the battery 14 are disposed, and a relatively large space is present above the heat exchangers and members such as the condenser 18 and the battery 14 in a conventional configuration. This space is utilized so that the engine harnesses 26 can be simply routed.

In the tractor 6 according to this embodiment, the intake pipe 17 is disposed to pass through the notch 23 formed in the fan shroud 12. The engine harnesses 26 attached to the ribs 17a of the intake pipe 17 pass through the notch 23 formed in the fan shroud 12.

In this manner, the engine harnesses 26 are routed to penetrate the fan shroud 12 so that the length of the engine harnesses 26 can be smaller than that in a case where the engine harnesses 26 are routed to bypass the fan shroud 12. Accordingly, manufacturing costs can be reduced, and maintenance can be easily performed.

In the tractor 6 according to this embodiment, the engine harnesses 26 are disposed farther from the engine body 1 than the ribs 17a of the intake pipe 17 are.

Accordingly, the engine harnesses 26 are routed to be farther from the engine body 1 than the ribs 17a are, and thus, maintenance of the engine harnesses 26 can be easily performed. That is, the ribs 17a are less likely to hinder detachment of the engine harnesses 26 from the engine 90 during maintenance, for example.

The tractor 6 according to this embodiment further includes the bind members 91 for binding the engine harnesses 26. The bind members 91 are fixed to the ribs 17a of the intake pipe 17.

In this manner, the bundled engine harnesses 26 are fixed to the ribs 17a of the intake pipe 17 through the bind members 91 so that the engine harnesses 26 can be routed in a stable state with a small number of components.

The tractor 6 according to this embodiment further includes the fixing member 94 attached to the bind members 91. The ribs 17a of the intake pipe 17 include the attachment hole 17b for detachably attaching the fixing member 94.

In this manner, the fixing member 94 can be easily fixed to the ribs 17a. In addition, the engine harnesses 26 can be easily removed from the ribs 17a by removing the fixing member 94 from the attachment hole 17b. Accordingly, maintenance can be easily performed.

The foregoing description is directed to the preferred embodiment of the present invention, and the configuration described above may be changed, for example, as follows.

In this embodiment, a longitudinal center portion of the support plate 32 is fixed to the condenser frame 31, and a rear portion of the support plate 32 is fixed to the radiator 13 (with the coupling bracket 45). However, fixture of the support plate 32 to the radiator 13 may be omitted.

Alternatively, the support plate 32 may be fixed only to the radiator 13. In this case, the radiator 13 corresponds to a first support member of the present invention. The support plate 32 may be fixed to another member (e.g., the fan shroud 12).

The mount plate 36 may be omitted so that the engine controller 2 is directly supported by the support plate 32 in a vibration controlled manner.

The number of the vibration-isolating rubber members 33 is not limited to three, and may be changed to one, two, or four or more. The arrangement of the vibration-isolating rubber members 33 may be changed as appropriate.

In the foregoing embodiment, the vibration-isolating rubber members 33 are arranged in such a manner that two of the three vibration-isolating rubber members 33 are oriented in the same direction and the other vibration-isolating rubber member 33 is oriented in a different direction. Alternatively, all the vibration-isolating rubber members 33 may be oriented in the same direction, or all the vibration-isolating rubber members 33 may be oriented in different directions.

In the above embodiment, the engine harnesses 26 are attached to the ribs 17*a* formed at the right of the intake pipe 17. Alternatively, the rib may be formed at the left of the intake pipe 17, and the engine harnesses 26 may be arranged on the ribs 17*a*. The rib for attaching the engine harnesses 26 may be disposed to project from the intake pipe 17 upward or downward.

In this manner, the plurality of ribs 17*a* are intermittently arranged on the intake pipe 17 along the longitudinal direction thereof. Instead, a single slender rib may be disposed along the longitudinal direction of the intake pipe 17.

The engine harnesses 26 may not be disposed above the ribs 17*a* and may be disposed below the ribs 17*a*

In the embodiment described above, the intake pipe 17 and the engine harnesses 26 are arranged to penetrate the notch 23 formed in the fan shroud 12. However, instead of the notch 23, the fan shroud 12 may have a through hole so that the intake pipe 17 and the engine harnesses 26 can pass through the through hole.

In the embodiment described above, the fixing member 94 is configured as a plate-shaped member. However, instead, the fixing member may include a bottom plate portion having the second hole 94*d* and a pair of side plate portions standing on the bottom plate portion so that each of the pair of side plate portions has a through hole for inserting the band part 93.

In the embodiment described above, the fixing member 94 is fixed to the ribs 17*a* with the attachment bolt 95 different from the fixing member 94. Alternatively, for example, a projecting shaft portion may be integrally formed on the fixing member so that the shaft portion is fixed to the attachment hole 17*b* of the ribs 17*a* with, for example, a snap-fit structure.

The fixing member 94 may be omitted so that the bind member 91 passes directly through the attachment hole 17*b* to attach the engine harnesses 26.

In the embodiment described above, the plurality of harnesses are collected and housed in the corrugated tube, and the harnesses are bundled by the bind member 91 with the corrugated tube interposed therebetween. Alternatively, the corrugated tube may be omitted so that the bind member 91 is directly wound around the plurality of harnesses and bundles the harnesses.

In the embodiment described above, the bind member 91 is a known resin binding band. The present invention, however, is not limited to this example, and instead, a simply cord-like member may be tied to be used. Instead of the bind member 91, a C-shaped clamp member, for example, may be fixed to the ribs 17*a* so that the ribs 17*a* support the engine harnesses 26.

REFERENCE SIGNS LIST 1 engine body
2 engine controller
6 tractor (agricultural tractor)
7 hood
12 fan shroud (partition plate)
13 radiator
31 condenser frame (first support member)
32 support plate (second support member)
33 vibration-isolating rubber member

The invention claimed is:

1. A tractor comprising:
an engine body;
a first support member disposed ahead of the engine body;
a second support member fixed to the first support member;
an engine controller supported on the second support member, the engine controller being configured to control the engine body, the second support member disposed above the first support member, the engine controller disposed above the second support member;
an intake pipe configured to supply intake air to an intake unit of the engine body;
at least one engine harness configured to electrically connect the engine body and the engine controller; and
a rib is formed along a longitudinal direction of the intake pipe, the rib configured to support at least one of the engine harnesses; and
wherein the rib extends radially away from an outer surface out the intake pipe.

2. The tractor according to claim 1, wherein:
a partition plate is disposed between the engine body and the engine controller, and
the engine harness is attached to the rib of the intake pipe in a region opposite to the engine body relative to the partition plate.

3. The tractor according to claim 2, wherein:
the intake pipe is configured to pass through a notch or a through hole in the partition plate, and
the engine harness passes through the notch or the through hole in the partition plate while being attached to the rib.

4. The tractor according to claim 1, wherein the engine body is closer to the rib than the engine harness.

5. The tractor according to claim 4, further comprising:
a band configured to bundle the engine harness,
wherein the band is fixed to the rib.

6. The tractor according to claim 5, further comprising:
a fixing member attached to the band,
wherein the rib has an attachment hole for detachably attaching the fixing member.

7. The tractor according to claim 6, wherein:
the intake pipe extends from a first end coupled to the engine body to a second end; and the second end of the intake pipe configured to be coupled to an air cleaner.

8. The tractor according to claim 7, wherein:
the rib defines one or more attachment holes; and
the band is configured to extend through one of the one or more attachment holes when the band is fixed to the rib.

9. The tractor according to claim 7, wherein the rib extends along at least at least 50% of the length from the first end to the second end of the intake pipe.

* * * * *